United States Patent
Merrill

[15] 3,680,369
[45] Aug. 1, 1972

[54] METHOD AND APPARATUS FOR DETERMINING CASTER TRAIL

[72] Inventor: Marcellus S. Merrill, 335 Colorado Blvd., Denver, Colo. 80206

[22] Filed: Jan. 15, 1970

[21] Appl. No.: 7,423

Related U.S. Application Data

[62] Division of Ser. No. 499,380, Oct. 21, 1965, Pat. No. 3,494,045.

[52] U.S. Cl. ................73/117, 33/203.12, 33/203.14
[51] Int. Cl. .............................................G01b 5/255
[58] Field of Search........73/117, 123, 124, 133, 146; 33/203.13, 203.14, 203.12

[56] References Cited

UNITED STATES PATENTS

| 3,208,154 | 9/1965 | Pancoast | 33/203.13 |
| 3,187,440 | 6/1965 | Merrill | 33/203.13 |

*Primary Examiner*—Richard C. Queisser
*Assistant Examiner*—Marvin Smollar
*Attorney*—Sheridan, Ross & Fields

[57] ABSTRACT

A method and apparatus for measuring the castor trail of the wheels of a motor vehicle. The apparatus includes a pair of fore and aft spaced, laterally movable velocity sensitive members which contact the wheels at two points of reference. The swinging of the wheels causes the members to move laterally, the resulting velocity of the members of measured and used to determine castor trail.

3 Claims, 17 Drawing Figures

PATENTED AUG 1 1972 3,680,369
SHEET 2 OF 6
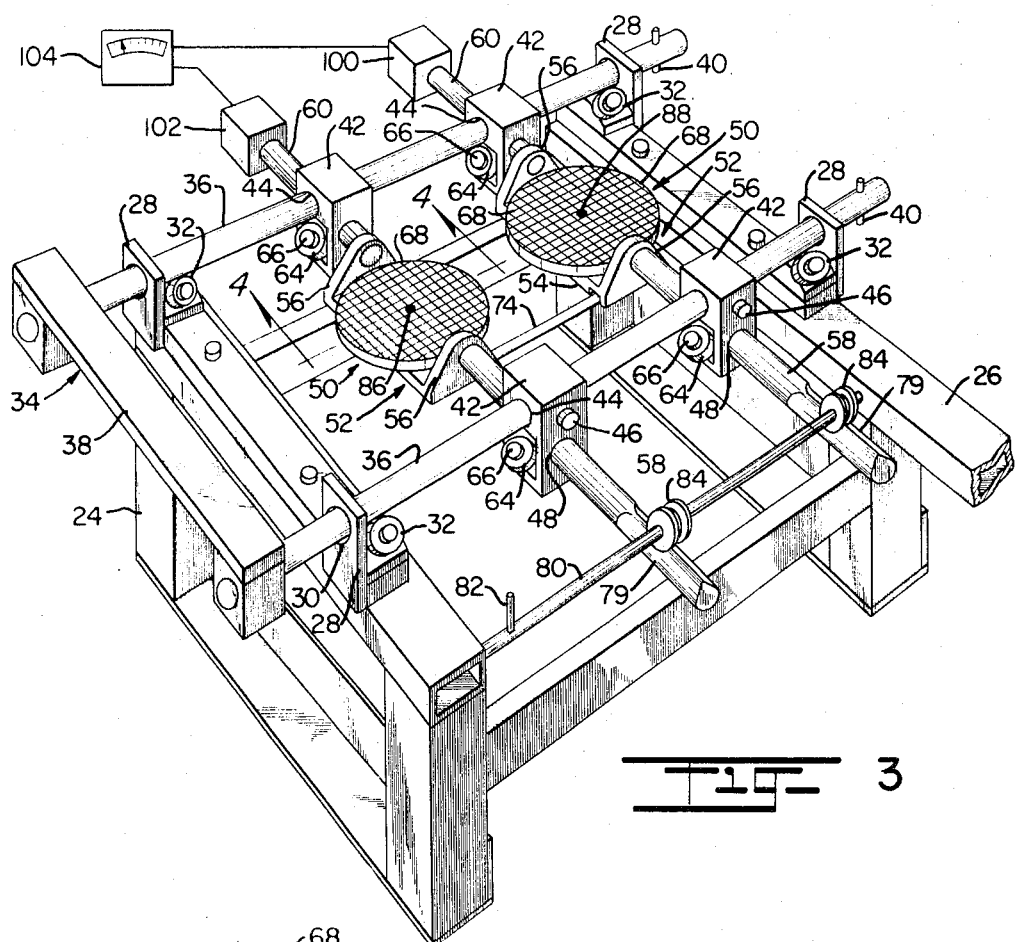
Fig. 3
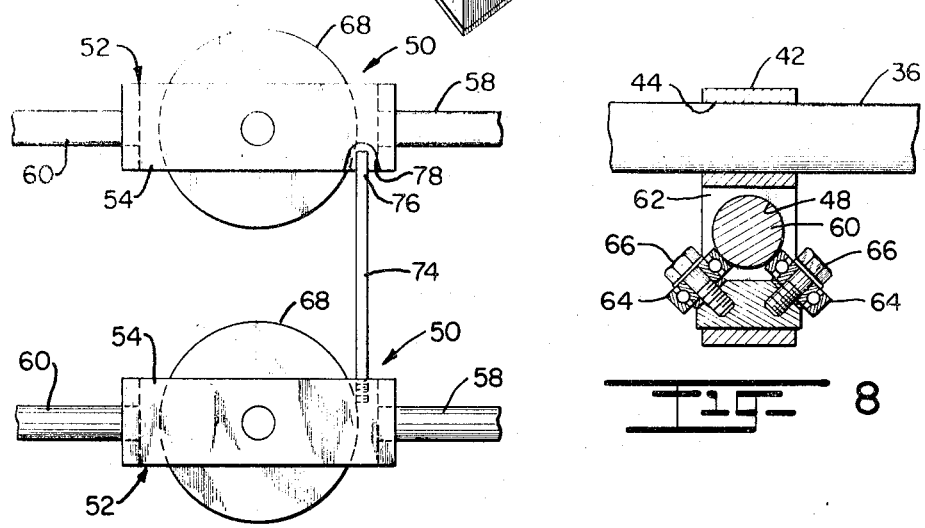
Fig. 7
Fig. 8

PATENTED AUG 1 1972 3,680,369

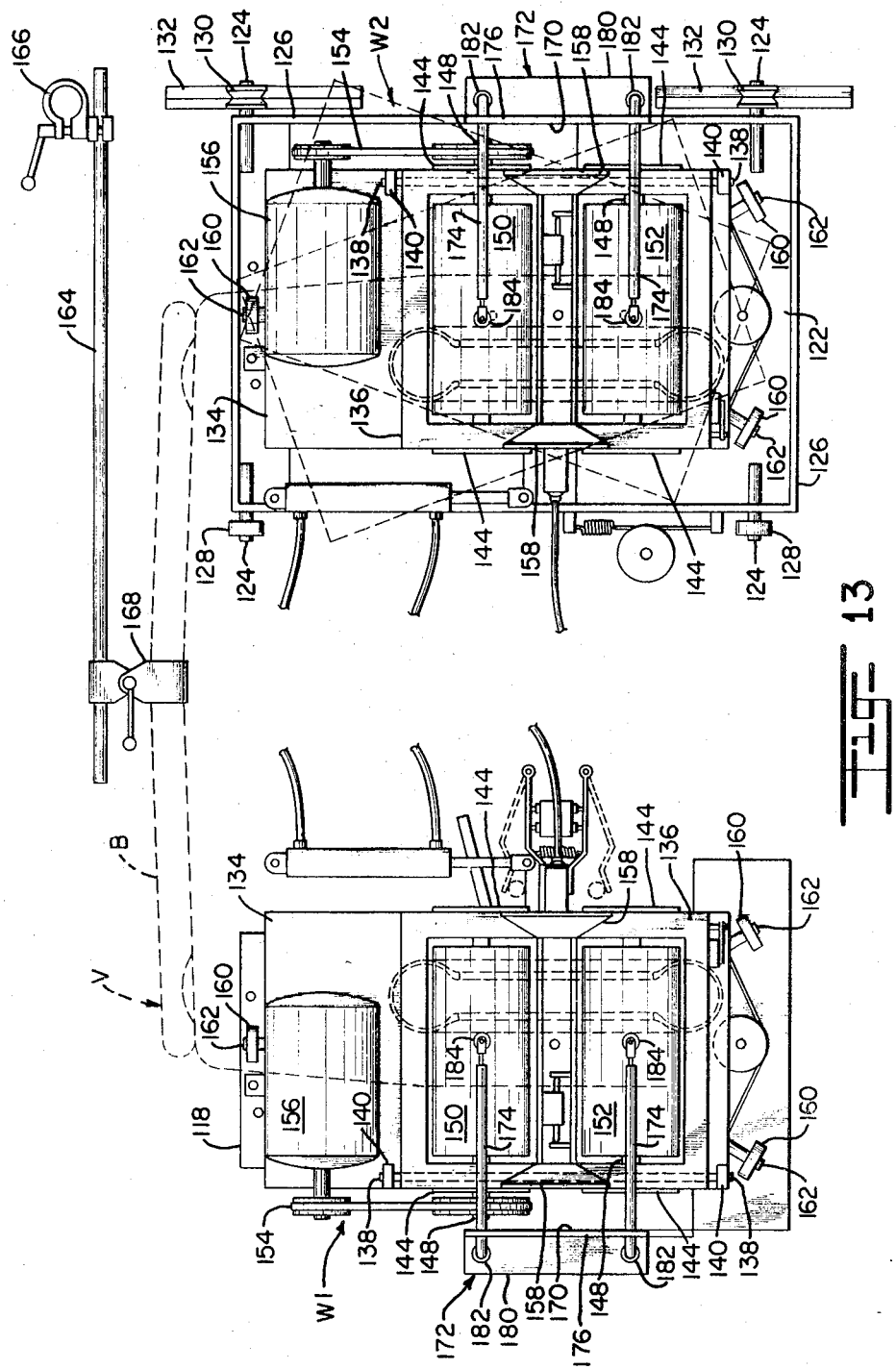

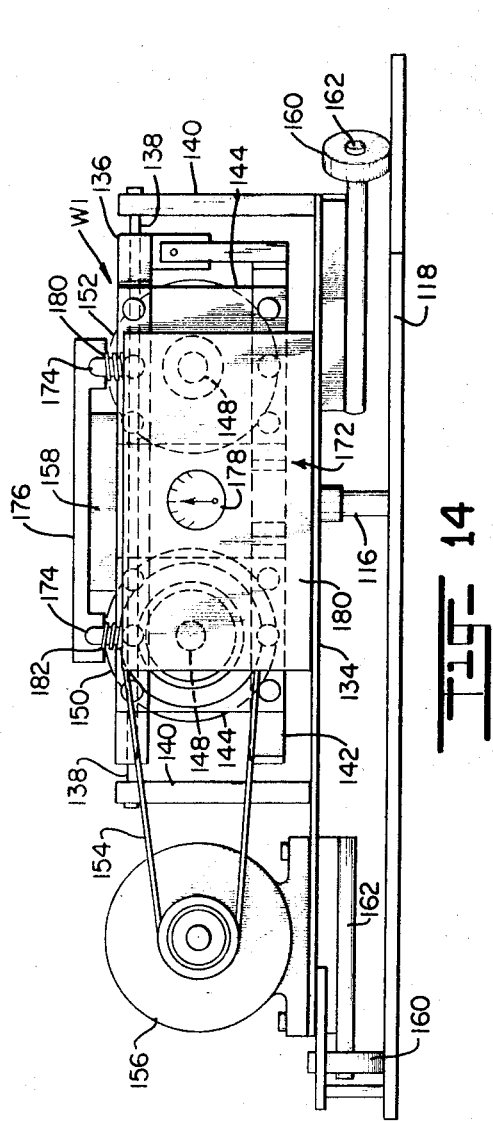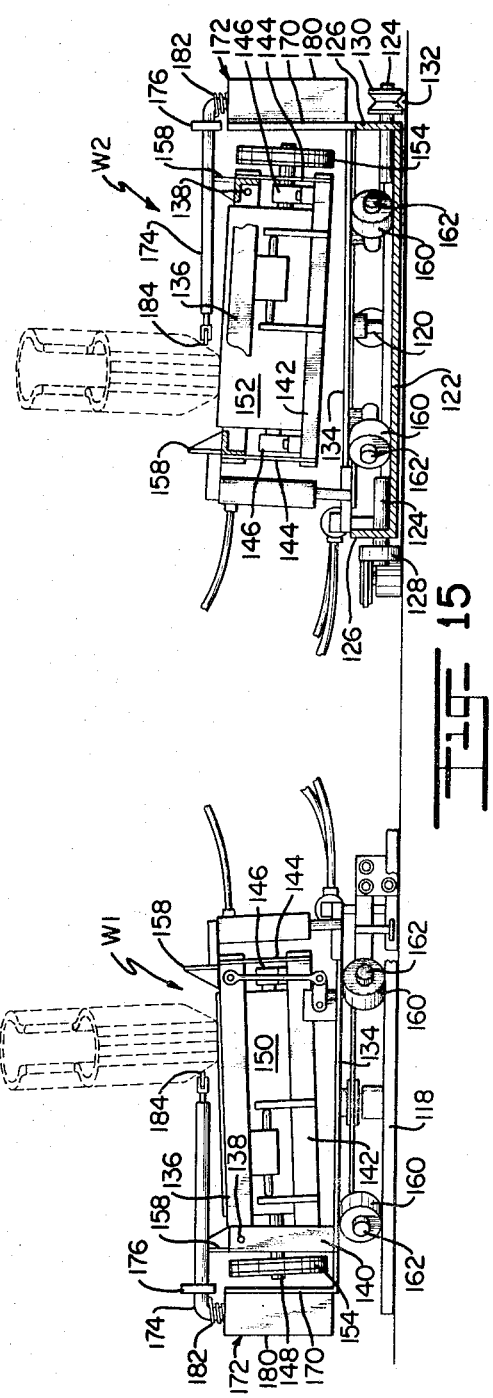

3,680,369

METHOD AND APPARATUS FOR DETERMINING CASTER TRAIL

This is a division of application Ser. No. 499,380, filed on Oct. 21, 1965 now U.S. Pat. No. 3,484,045.

This invention lies in the general field of automotive vehicle maintenance and is directed particularly to a novel method and apparatus for directly determining the actual amount of static, pneumatic and kinetic caster trail of a steerable wheel on a vehicle, such as the conventional steerable front wheels of passenger automobiles and trucks. The new system is more practical in effect than the present system which is based on determining the caster angle of the kingpin of the wheel mounting.

Each front wheel of a motor vehicle such as a passenger car or truck is conventionally mounted on a steering knuckle which includes a spindle or axle on which the wheel rotates. The steering knuckle in turn is mounted on a kingpin which is a part of the suspension structure whether the latter is a solid cross axle or an independent suspension system. While the kingpin may be considered as generally upright, it usually is angled in two directions. For design reasons it is located several inches inward toward the center of the vehicle away from the wheel. Since it is desirable to have its axis intersect the ground rather close to the path of the center of the wheel tread, its axis is inclined downwardly and outwardly. It is also usually desired that the mounting have more or less caster effect and therefore the axis is usually also inclined downwardly and forwardly. This latter is referred to as the caster angle.

The caster angle provides a static caster trail which in effect is equivalent to the conventional industrial or household caster in which the wheel axis is offset from the axis of the vertical spindle such as is similar to the condition existing with the front "fork" on a bicycle. The static caster trail assists the wheel to follow or "track" in the direction of travel and increases the reaction or resistance to steering wheel displacement on which the driver relies for his sense of direction. The action of the usual pneumatic tire produces a very substantial castering tendancy frequently referred to as pneumatic trail. The two trails together constitute the stabilizing effect on the steerable wheels.

The pneumatic trail on modern passenger cars is so substantial that the actual static caster trail and caster angle have become very small or even negative. The angle may vary from 1½° positive to 1½° negative on various makes, depending on the wheel and tire size and total design geometry. Unfortunately, heretofore no simplified method or apparatus was available to measure either pneumatic or dynamic caster trail.

The conventional method of measuring the caster angle consists in "steering" or swinging the wheel through equal angles in either direction from straight ahead and measuring the change in the camber angle of the wheel between the two extreme positions. In a typical example, if the wheel has 1° of caster angle and is swung through 10° in either direction, the complete change of camber will be 0.347°. Thus it will be seen that the determination of modern small caster angles by the conventional method entails the accurate measurement of very small angles. This is extremely difficult and is made more so by the usual looseness of the connections in cars which have been driven many thousands of miles. Consequently this method leaves much to be desired.

Moreover, when the caster angle is relied on as a measure of the trail, it is assumed that the kingpin centerline intersects the spindle centerline. While this is generally true it is not universally so. Many vehicles have been built in which the kingpin has been offset forward or rearward of the spindle. In such cases the caster trail is the only true measure of the castering effect.

Another disadvantage of reliance on the measurement of caster angle is that the "feel" of the steering depends on the actual trail which includes the effect of pneumatic trail, rather than on the caster angle itself. The actual trail with a given caster angle alters with the standing height of the tire, which varies greatly between small cars and commercial vehicles. Further, where the spindle is offset from the centerline of the ball joints either through design or manufacturing error, the effect on steerability is significant although such offset has no effect on the amount of caster angle.

The various difficulties and disadvantages mentioned above have been overcome by the use of the present invention. The method of procedure is based on some rather simple geometry. For purposes of illustration it can be assumed that the kingpin extends vertically, lies in the central vertical plane of the wheel, and is displaced a short distance forward of the spindle axis. The basic principle is substantially the same when the kingpin is offset and tilted although the mathematics are somewhat more complicated.

To carry out the method, two points are selected on the periphery of the wheel equidistant fore and aft of the axle, or the axis of the spindle. Since the accuracy of the indicated trail depends on the height of the wheel center or axle above a line joining the center of the two points, the preferable height of the wheel center above a line so joining the two points being the same as the distance between the road and the wheel axle, it will be understood that a correction factor will be used where the distance between the wheel axle and such a line is less than the distance between the wheel axle and the road. Where two points are selected as indicated, the trail is positive and therefore the effective vertical axis about which the wheel swings or "steers" is slightly forward of the axle and thus closer to the forward reference point. The distance between the reference points is known and constant. A straight fore and aft base line can be drawn through the projections on a horizontal plane of the fore and aft reference points, the wheel axle, and the caster axis about which the wheel swings. The distance between the axle and the caster axis is the actual trail.

If the wheel is now swung through a small angle, say 2° to 5° to each side of its original position, the extreme positions of the base line will define equal angles fore and aft of the caster axis. While the reference points actually describe arcs, the angle is so small that the tangent and the sine of the angle are substantially the same and thus, it can be considered that the reference points have, in essence, moved in straight lines perpendicular to the original position of the base line, producing two similar triangles, the forward triangle having a shorter base than the aft triangle. These bases represent the total lateral displacement of the two reference points, and since they are linear distances they can be measured very easily and accurately.

It can be shown mathematically that the static trail is equal to the product of a sum equal to one-half the distance between the reference points and the quotient of the difference between the lengths of said bases divided by the sum of the lengths of said bases. Therefore, the method might be described very simply as selecting two reference points on a wheel circumference or with respect to a wheel circumference equidistant fore and aft of the axle, swinging the wheel laterally through a predetermined, preferably small, angle, measuring the total lateral displacement of each reference point, and computing the trail in accordance with the formula just described.

The static caster trail may also be determined by mounting a steerable, vehicle mounted wheel in a selected direction upon a pair of supports located fore and aft of the wheel axle, swinging the wheel through a predetermined angle, sensing the amount of force transmitted by said wheel longitudinally of said supports during the swinging thereof and generating signals proportional thereto, correlating said signals from said supports in a predetermined manner, and utilizing said correlated signals to compute the amount of static caster trail. The kinetic caster trail of a steerable, vehicle mounted wheel may be determined by arranging a wheel in a selected direction, locating two reference points with respect to the wheel fore and aft of the wheel axle, rotating the wheel, swinging simultaneously the rotating wheel and the reference points through a predetermined angle, measuring the total lateral displacement of each of the reference points, and comparing the extents of said displacements to compute the amount of caster trail.

The kinetic caster trail of a steerable, vehicle mounted wheel may also be determined by mounting a wheel in a selected direction upon a pair of rotatably mounted wheel supports located fore and aft of the wheel axle, rotating the wheel, swinging the rotating wheel through a predetermined angle, sensing the amount of force transmitted by said wheel longitudinally of said supports during the swinging thereof and generating signals proportional thereto, and utilizing said signals to compute the amount of kinetic caster trail. The pneumatic caster trail of a steerable, vehicle mounted wheel may be computed by determining the static caster trail by mounting a wheel in a selected direction upon a pair of supports located fore and aft of the wheel axle, swinging the wheel through an angle, sensing the amount of force transmitted by said wheel longitudinally of said supports during the swinging thereof and generating signals proportional thereto, and utilizing said signals to compute the amount of static caster trail; determining the kinetic caster trail in the manner described in the preceeding sentence; and utilizing the static and kinetic caster trails so determined to compute the amount of pneumatic trail.

The apparatus in one of the preferred forms comprises a pair of fore and aft spaced, laterally movable cross members adapted to contact the wheel at the reference points. Swinging of the wheel causes the cross members to move laterally and their movement can be measured with dial gages or other measuring devices. The usual offset of the kingpin induces a small fore and aft movement of the wheel as it swings. This must be accommodated to avert shifting of the points of contact between the wheel and the cross members. Therefore the cross members are mounted on a frame which may move fore and aft.

The two reference points need not be equidistant from the wheel axle in order to practice the invention but inequality complicates the equation. Equal distances are preferred both because the equation is simpler and because the apparatus is simpler and easier to operate. It is preferred that the distance between a line joining such points and the wheel center approximates the distance between the wheel center and the road when the wheel is in contact with the road, such distance being less than the radius of the wheel due to deformation of the pneumatic tire on the road.

Instead of measuring the total displacement of the reference points it is possible to measure their relative velocity at some point in their travel. In such case the form of the equation is modified to express the trail in terms of the ratio of the velocities.

The apparatus in another form comprises a pair of spaced apart wheel supports, each support including means for sensing the amount of force applied longitudinally thereof as a result of swinging a wheel adapted to be disposed thereon through a predetermined angle and generating a signal proportional thereto, and means responsive to said generated signals for determining the amount of static caster trail. Another form of an apparatus constructed in accordance with this invention comprises a pair of rotatably mounted wheel supports, each support including means for sensing the amount of longitudinal force applied therealong by swinging the wheel adapted to be disposed thereon and generating a signal proportional thereto, means for rotating said supports, and means responsive to said generated signals for determining the static, pneumatic, and kinetic caster trails.

Various other advantages and features of novelty will become apparent as the description proceeds in conjunction with the accompanying drawings in which:

FIG. 3 is a perspective view of one-half of the apparatus of FIG. 1;

FIG. 7 is a bottom plan view of a pair of cross members with an aligning rod extending between them;

FIG. 8 is a sectional view taken on line 8—8 of FIG. 2;

FIG. 13 is another embodiment of an apparatus constructed in accordance with the subject invention in which rotatably mounted support members are used in lieu of pivotally mounted pads and a pair of wheel engaging means are used to sense lateral displacements of a pair of points with respect thereto;

FIG. 14 is a side view of the left wheel engaging assembly shown in FIG. 13;

FIG. 15 is an end view of the apparatus shown in FIG. 13;

Figure 9:
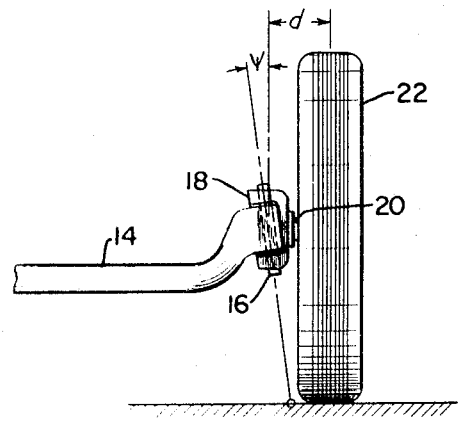
FIG. 9 is a front elevational view of a solid cross axle and a wheel showing the kingpin position and relation.

A typical arrangement of a vehicle wheel mounted on a cross axle is shown in FIG. 9, in which the cross axle 14 carries a kingpin 16, which in turn carries steering knuckle 18. The knuckle is in the form of a yoke and is provided at its mid point with a spindle or wheel axle 20 on which the wheel 22 is mounted for rotation. It is to be understood that the term "wheel" as used herein contemplates the usual vehicle wheel together with its pneumatic tire. The kingpin is bodily displaced or offset from the central plane of the wheel inwardly toward the centerline of the vehicle by the horizontal distance $d$. The point of contact of the kingpin axis with the ground is preferably as close as practicable to the path of the tread of the wheel. Accordingly it is inclined downwardly and outwardly at an angle $\psi$ to the vertical.

Figure 10:
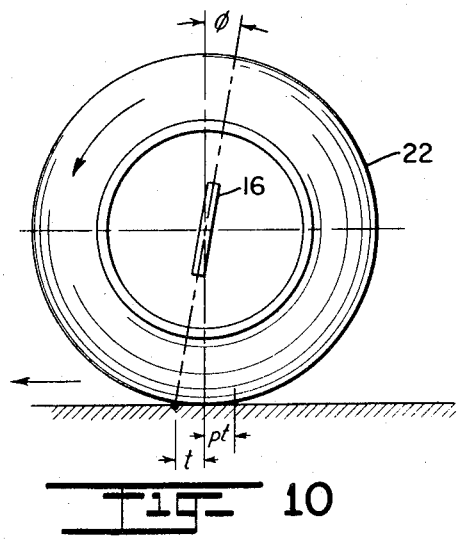
FIG. 10 is a side elevational view of a wheel showing the caster angle of the kingpin.

In FIG. 10 it will be seen that the kingpin 16 is also inclined downwardly and forwardly at an angle $\phi$ to the vertical. This is called the caster angle. The point of intersection of the kingpin axis with the ground is forward of the point of intersection with the ground of a vertical line passing through the axis of the wheel axle by a distance $t$. This is the actual caster trail and causes wheel 22 to track properly in the direction of travel. The function is substantially the same as if the kingpin were vertical and its axis intersected the ground at the same point. The resilient action of the tire with respect to the ground produces a further castering action which may be greater than that of the caster trail. It is referred to as pneumatic trail and is indicated in FIG. 10 by $pt$.

Figure 11:
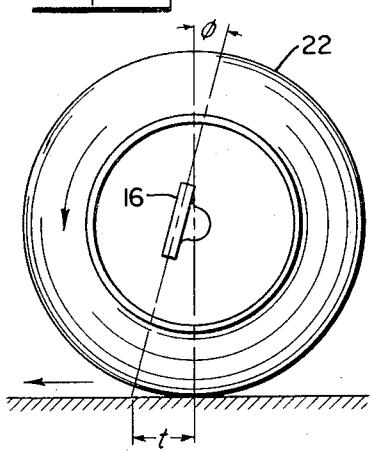
FIG. 11 is a view similar to FIG. 10 but showing the kingpin offset forwardly ahead of the wheel axle.

It will be seen by reference to FIG. 11 that when the caster angle $\phi$ is maintained constant but the kingpin is offset forwardly of the spindle or wheel axle the caster trail $t$ is increased. This illustrates one reason why measurement of caster angle is not satisfactory. The angle in FIGS. 10 and 11 is the same but the actual trail and the effect on steering are entirely different. With the apparatus and method about to be described the technically correct answer is obtained by simple measurements and simple computation.

Figure 1:
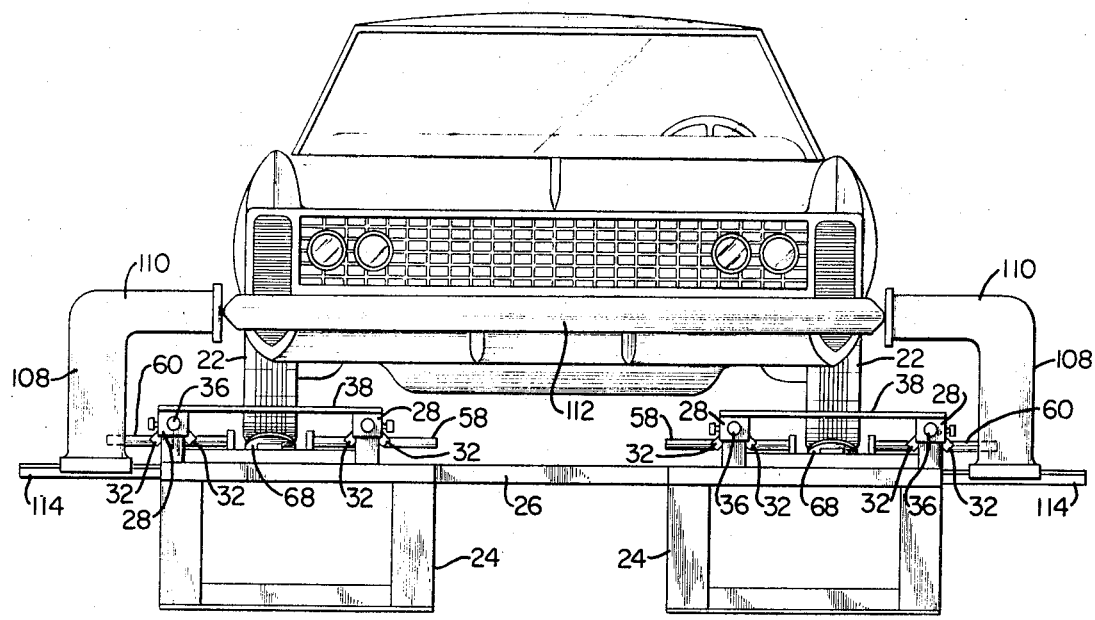
FIG. 1 is a front elevational view of a complete apparatus with a vehicle resting thereon in position to carry out the measuring operation.

A complete testing apparatus is shown generally in FIG. 1 and comprises right and left box-like, built up framework supports 24 connected by a cross bar 26 to maintain them in proper relation. The upper members of each support are provided with guide plates 28 having guide apertures 30, and also with anti-friction rollers 32. A frame 34 to be carried by said support comprises a pair of cylindrical elongate shafts 36 rigidly connected at one end by a cross bar 38. Shafts 36 pass through apertures 30 and are supported for longitudinal movement on the rollers 32. Stop pins 40 near the free ends of the shafts limit longitudinal movement and maintain frame 34 and support 24 in assembled relation.

Four blocks 42, each provided with an aperture 44, are mounted by said apertures on the shafts 36. Each block of a forward pair is set in exactly the same fore and aft position, and the blocks of an aft pair are set in positions exactly the same distance behind each companion block. Each block is locked in position by a bolt or other fastener 46. Ordinarily the blocks will be permanently retained in selected fore and aft positions as shown, but the spacing can be changed if desired by loosening the bolts.

Each of blocks 42 is further provided with apertures 48 arranged below and at right angles to apertures 44 to provide transverse bearings for receiving the cross members which support the vehicle in the course of the checking operation. Each of the two fore and aft spaced cross members 50 includes a cradle 52 in the form of a flat base 54 and upstanding lateral flanges 56. Each flange is apertured to receive a laterally extending shaft 58,60 respectively, which shafts are mounted in apertures 48 for lateral movement in the direction of their axes and for rotation about their axes.

The intermediate portion of each block 42 is cut away as at 62 to form a chamber to receive anti-friction rollers 64 mounted at angles therein by bolts 66, as best seen in FIG. 8. Shafts 58 and 60 ride on these rollers and consequently there is practically no resistance to lateral movement of the cross members in response to swinging of the wheel even though they are supporting one corner of the vehicle.

Figure 4:
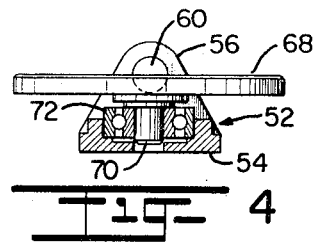
FIG. 4 is a sectional view taken along 4—4 of FIG. 3.

A generally planar pad 68 is carried by each cradle and, as seen in FIG. 4, is mounted thereto by an integral depending stud or shaft 70 secured in the inner race of anti-friction bearing 72 which in turn is secured in the base 54 of the cradle. Thus the pad moves with the cradle in tilting and in lateral movement, and is Also rotatable with respect thereto about an axis which is normal to the plane of the pad and also normal to the laterally extending axis of the cross member. With this configuration and arrangement the pad can readily align itself to be tangent to the wheel and also follow the wheel as the latter is swung laterally. The distance between the axes of the fore and aft shafts 60 is fixed for reasons to be more fully explained later and it is necessary for the pads to contact the wheels at the same spacing regardless of the diameter of the wheel. To accomplish this, the pad is so dimensioned and mounted that its wheel contacting face is coplanar with the axis of shaft 60 as can be seen in FIG. 4.

In order to prepare the apparatus to receive a vehicle for checking or inspection it is necessary that the pads be exactly aligned in the fore and aft direction and that they be locked in horizontal coplanar attitude. The vehicle wheel can then be rolled on with its central vertical plane aligned with the centers of the two pads until the wheel axle, or the axis of the spindle, is substantially centered over a point midway between the centers of the pads. The cross members are then unlocked and the pads tilt until they are tangent to the wheel periphery.

The fore and aft alignment of the pads is accomplished, as seen in FIGS. 3 and 7, by providing an aligning rod 74 which is fixed to the forward cradle base 54 and has a free end 76 adapted to engage in a guide slot 78 formed in the lower surface of the aft cradle base 54. Since the alignment is accomplished with no load on the apparatus, the parts can be readily moved by hand. The aft cradle is first swung to a horizontal position. Then the forward cradle is swung toward horizontal position until the free end 76 strikes the lower surface of the aft cradle. The two cradles are then adjusted laterally until free end 76 enters the guide slot 78. The pads and cradles are now ready to be locked.

The outer portions of shafts 58 are formed with a wedge-like cross section as seen in FIG. 3 at 79, with the narrow end of the wedge uppermost when the pads are horizontal. Located above shafts 58 and extending at right angles thereto is lock shaft 80 which is mounted both for eccentric rotation and longitudinal sliding movement in bearings (not shown) in the frame members at the fore and aft ends of support 24. The lock shaft is provided with an operating handle 82 and with a pair of lock members 84. Each of these members has the configuration of a conventional grooved pulley and is eccentrically mounted on shaft 80 and fixed to it to rotate therewith. They are spaced longitudinally at the same center distance as shafts 58. When they are turned to their upper position as shown in FIG. 3, they are well spaced from shafts 58 and the latter are free to rotate. When the shafts 58 are rotated to the position shown, the lock members are turned down, straddling the wedge sections 79 in close contact and locking the shafts 58 against rotation. Sections 79 have appreciable length so that the lock members can operate in any lateral position of the cross members. Since lock shaft 80 is longitudinally movable, the lock members can also follow the fore and aft movement of frame 34 and cross members 50.

Figure 6:
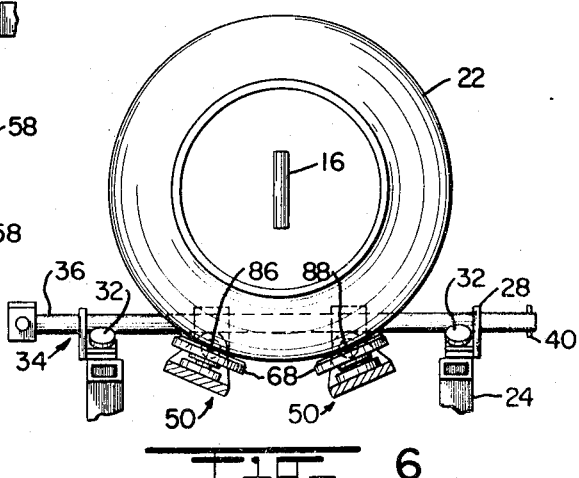
FIG. 6 is a sectional view taken on line 6—6 of FIG. 5.

When a vehicle has been driven onto the apparatus as seen in FIG. 1 and the front wheels have been properly centered as described above, lock members 84 are moved to their release position and the weight on the wheel will lower it to the position shown in FIG. 6, causing pads 68 to rotate and lie tangent to the periphery of the wheel. The centers 86 and 88 of the pads are always in the same positions as the axes of shafts 58 and 60 and are spaced a constant distance apart fore and aft. These centers constitute reference points for use in subsequent measurement and calculation.

Figure 5:
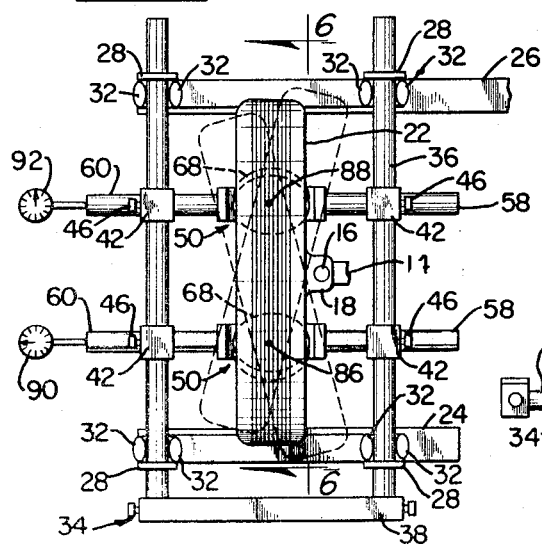
FIG. 5 is a top plan view of the apparatus of FIG. 3, diagrammatically illustrating its operation.

The operation of the apparatus is diagrammatically illustrated in FIG. 5, in which the lateral movements of the wheel are greatly exaggerated for clarity, the actual movement being only a few degrees. The wheel 22 is resting on pads 68 as previously indicated in FIG. 6, and is in fore and aft attitude substantially parallel to the longitudinal axis of the vehicle, as indicated by the solid line showing. Conventional dial type linear measuring gauges 90 and 92 are mounted so that their stems contact the ends of shafts 60. As depicted, the kingpin 16 is offset toward the vehicle longitudinal center line and is located so that the caster trail is zero. When the wheel is "steered" or swung laterally its fore and aft portions move both laterally and longitudinally.

Considering the motions separately, swinging of the wheel clockwise will move the forward pad 68 and its reference point 86 to the left and will move the aft pad 68 and its reference point 88 to the right. When the wheel has been moved through the desired angle, the dial gauges are read to determine the extreme lateral movements of the reference points in the first direction. The wheel is now swung in the opposite direction and the pads and references points move correspondingly. The gauges are again read, and the total lateral movement of each reference point is determined. When these values are put into the formula mentioned above, the answer will be zero for in this case the caster trail is zero and the extent of movement of the two reference points is the same. In the usual case kingpin 16 is offset ahead of the wheel axle toward reference point 86, and the lateral travel of point 86 will be less than that of point 88. Application of the formula will result in a positive value for the static caster trail.

Wheel 22 also moves forwardly and rearwardly, as indicated by the dotted line showings, when the kingpin is offset laterally. However, cross members 50 are free to follow this movement because they are carried by frame 34 which is mounted for longitudinal movement on support 24. Hence this movement is completely accommodated and produces no effect on the measurements.

Figure 2:
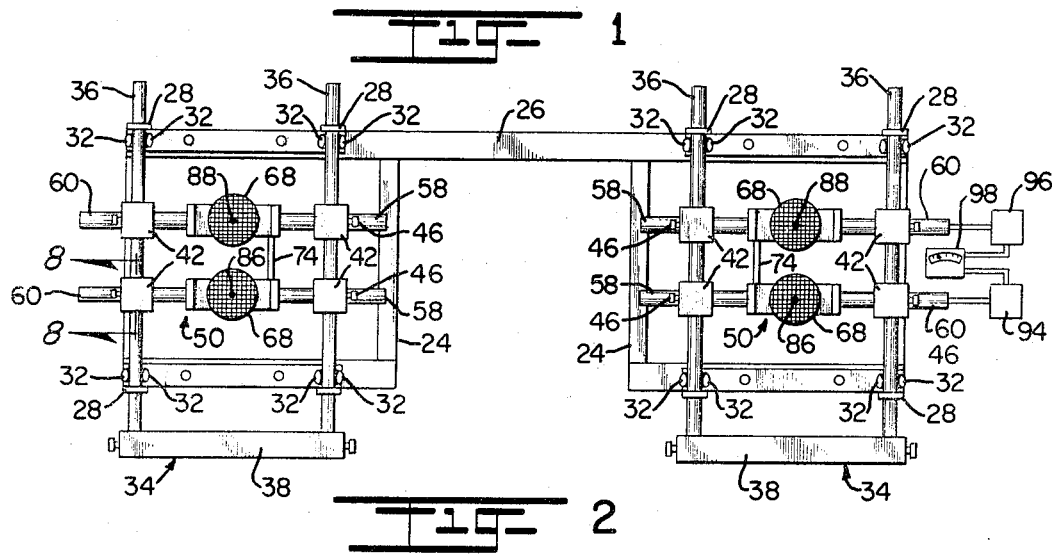
FIG. 2 is a top plan view of the apparatus of FIG. 1.

Instead of direct reading dial gauges, linear potentiometers 94 and 96 may be used as indicated in FIG. 2, and their voltages may be transmitted to meter 98. The meter may be calibrated in terms of linear measurement or it may include a computer system to translate the measured values into the actual static caster trail.

The formula for determining the static caster trail can be readily modified to cast it in terms of relative velocity and the movements of the cross members can be measured in terms of relative velocity. To carry out this scheme, as shown in FIG. 3, velocity transducers 100 and 102 are associated with the ends of shafts 60 and the values produced when the shafts are relatively moved are transmitted to computer meter 104 which translates the signals into a direct reading of the static caster trail.

One type of velocity transducer which is suitable for this purpose is Position/Velocity Transducer Model TCC-DV-301 manufactured by Transducer Controls Corporation of Covina, California. Computer meter 104 can include a Burr-Brown 4098/25 multiplier/divider to determine the ratio between velocity transducers 100 and 102 to provide a signal for the meter.

Figure 12:
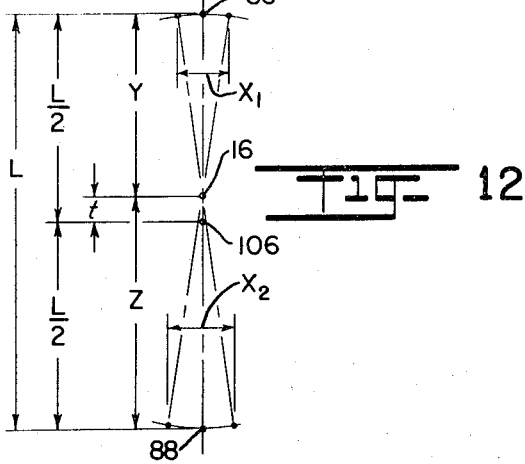
FIG. 12 is a diagrammatic illustration of the elements entering into the practice of the method.

The schematic showing in FIG. 12 will help to illustrate how the formula may be derived for determining static caster trail from the simple mechanism and measurements which have been described. For geometrical simplicity the kingpin is taken to be vertical and directly in the central plane of the wheel. A laterally offset kingpin would complicate the explanation but the final result would be the same. Kingpin 16 is shown located a short distance $t$ ahead of the axis of the wheel axle or spindle 106, the distance $t$ representing the static caster trail, and 86 and 88 being the reference points equidistant fore and aft of wheel axle 106. The total distance between the reference points is L. The distance from 86 to 16 is Y and the distance from 88 to 16 is Z. Since 16 is the kingpin it represents the point about which the wheel is "steered" or swung laterally.

Point 88 is swung through selected equal angles to each side of the fore and aft central plane of the wheel in its starting position and produces a similar but smaller movement of point 86. Lines drawn from 86 to 88 at the extreme positions produce equal angles at each side of point 16. Since the total movement is very slight, from 2° to 5° each side of center and preferably of the order of 2°, the arcs can be ignored and the result is similar triangles. The upper triangle as viewed in FIG. 12 has a base of $X_1$ and a height of $Y$, while the lower triangle has a base of $X_2$ and a height of $Z$.

Now $X_1/Y = X_2/Z$ and $X_1/x_2 = Y/Z$ $$Y = \frac{L}{2} - t$$

$$Z = \frac{L}{2} + t$$

$$\frac{X_1}{X_2} = \frac{\frac{L}{2} - t}{\frac{L}{2} + t}$$

Solving for $t$, we obtain $$t = \frac{L}{2} \cdot \frac{X_2 - X_1}{X_2 + X_1}$$

Thus, the trail can be determined in terms of the sum and the difference of the lateral displacements of the reference points. If it is desired to use ratios, and the ratio $X_1/X_2$ is taken to be $\beta$, then the formula can be modified to result in $$t = \frac{L}{2} \cdot \frac{1 - \beta}{1 + \beta}$$

Since the relative velocities are comparable to the relative displacements the same formula can be used, substituting velocity ratios and using the instruments shown in FIG. 3.

In FIG. 13 is shown a top plan view of another embodiment of an apparatus constructed in accordance with this invention. The apparatus shown in FIG. 13 is similar to that shown and described in my U.S. Pat. No. 3,187,440. Generally speaking, the apparatus as shown in FIGS. 13–15, includes left and right wheel-engaging assemblies W1 and W2, respectively, positioned in spaced relation on a level surface and where the spacing between centers of the wheel-engaging assemblies generally correspond with the axle width of a conventional motor vehicle so that the assemblies are disposed to support either the front or rear wheels of the vehicle. Broadly, each wheel-engaging assembly is comprised of common elements, with the exception that the assembly W1 is pivotally mounted at its center on a shaft 116 projecting upward from a stationary floor base 118, whereas the assembly W2 is pivotally mounted at its center on a shaft 120 projecting upwardly from a slidable floor base 122. The floor base 122 is carried by a fore and aft roller assembly including horizontal shafts 124 projecting through side walls 126; inner rollers 128 are drilled to the shaft 124 on one side of the floor base and outer concave rollers 130 are drilled to the shaft 124 at the other side of the base, the rollers 130 being formed to engage with tracks 132 so as to control the forward and reverse movement of the assembly W2 in relation to assembly W1. In this way, the left side assembly W1 is fixed and for example would locate the left wheel of the vehicle, but the right side assembly, being free to move fore and aft, would align itself with the right wheel and thus avoid the necessity of driving the vehicle onto the assemblies exactly parallel to a fixed line.

Referring in more detail to the common elements of the wheel assembly, each includes a generally rectangular base plate 134 pivotally mounted on the shafts 116 and 120, and in turn an upper tilting frame 136 of open rectangular shape, is pivotally mounted along the top outside edge of a pin 138 extending between bars 140 projecting upwardly from the base plate 134. A pair of front and rear lower tilting frames 142 are suspended by means of flat springs 144 in space relation beneath each upper tilting frame for positioning of front and rear spaced pairs of pillow blocks 146, the latter being arranged to receive the opposite ends of shafts 148 for front and rear rollers 150 and 152, respectively. Ample clearance is provided between the roller ends and the upper ends of the upper tilting frame to permit axial movement of the lower frames and rollers in relation to the upper frame and in this connection, the rollers are mounted within the upper tilting frame in normally coincident, spaced parallel relation to form a central opening or "notch" therebetween to locate the vehicle wheels. Thus, the lower tilting frames 142 permit individual suspension of the rollers 150 and 152 through the leaf springs from the upper coming tilting frame, so that the rollers are mounted for differential axial movement relative to one another. The front roller 150 of each assembly serves as the drive roll and the rear roller 152 as the follower roll, the front roller being driven through a suitable V-belt drive system 154 connected to motor 156. Conical members 158 on upper frame 136 defice end retainers to prevent the vehicle wheels, once properly located, from slipping off the ends of the front and rear rollers under rotation.

In order to support firmly the entire wheel assembly while permitting it to pivot freely about center shafts 116 and 120, each of the wheel assemblies, and specifically the base plates, is free to rotate about the center shafts on rollers 160 which are journaled on horizontal shafts 162 extending radially between the base plate and floor base and being secured to the underside of the base plate. This arrangement will avoid any undue binding of the assembly about the center shaft and make each wheel assembly sensitive to any slight force that is applied thereto. Ahead of the wheel assemblies, a horizontal stabilizing bar 164 is supported by suitable means such as post 166 and has a vise 168 at its free end for connection to the front bumper B of a vehicle V represented in FIG. 13. In the above overall relation described, it will be evident that a vehicle may be driven onto the assemblies W1 and W2 with its front wheels properly located on the rollers and thereafter the vehicle may be located in place to prevent undue lateral shifting by means of the vise 168. The motor 156 for each wheel assembly drives the associated front roller 150 through a belt 154 as described which in turn spins the associated vehicle wheel. In practice the assemblies may be mounted in a pit, or if surface mounted, the rear wheels are most desirably supported on a rack in order to have the entire vehicle level while measurements are being made.

Figure 16:
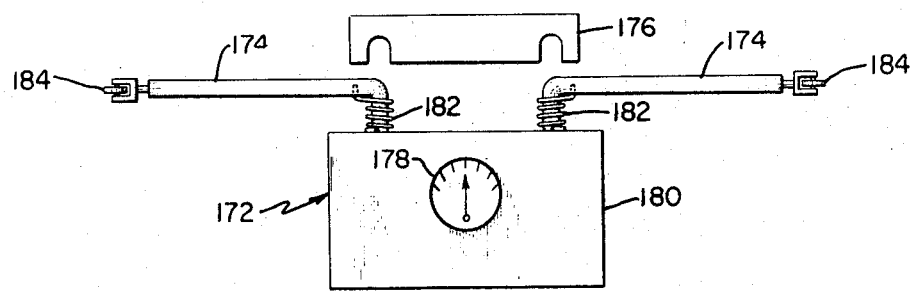
FIG. 16 is an elevational view of the device shown in FIGS. 13-15 for sensing the displacement of a pair of points taken with respect to a mounted, rotating wheel.

Each base plate 134 has an upwardly extending flange portion 170 upon which is securely mounted a device 172 for sensing the lateral displacement of a pair of points located with respect to a corresponding wheel and generating a signal proportional thereto. The device 172 comprises a pair of pivotally mounted arms 174, a yoke member 176, and a meter 178 mounted within the housing 180, see FIG. 16. Each arm 174 is biased by spring 182 to position the arm 174 as shown in FIGS. 16 when the device is not in use. Each arm 174 has a roller 184 biased for translatable movement therein. Each roller 184 is connected to a suitable mechanism for generating a signal proportional to the movement thereof such as a linear potentiometer mounted within the housing 180. The signals generated as a result of the movement of rollers 184 are transmitted to meter 178. The meter 178 may be calibrated in terms of linear measurement or it may include a computer system to translate the measured values into actual static caster trail. It will be understood that the device shown in FIGS. 13–16 for measuring the horizontal movement of a pair of points taken with respect to a rotating wheel is merely illustrative of one way of doing same and that other ways may be used if desired or required. It will also be appreciated that a more detailed description and explanation of the wheel supporting apparatus shown in FIGS. 13–16 may be had by referring to my aforementioned U.S. Pat. No. 3,187,440.

Figure 17:
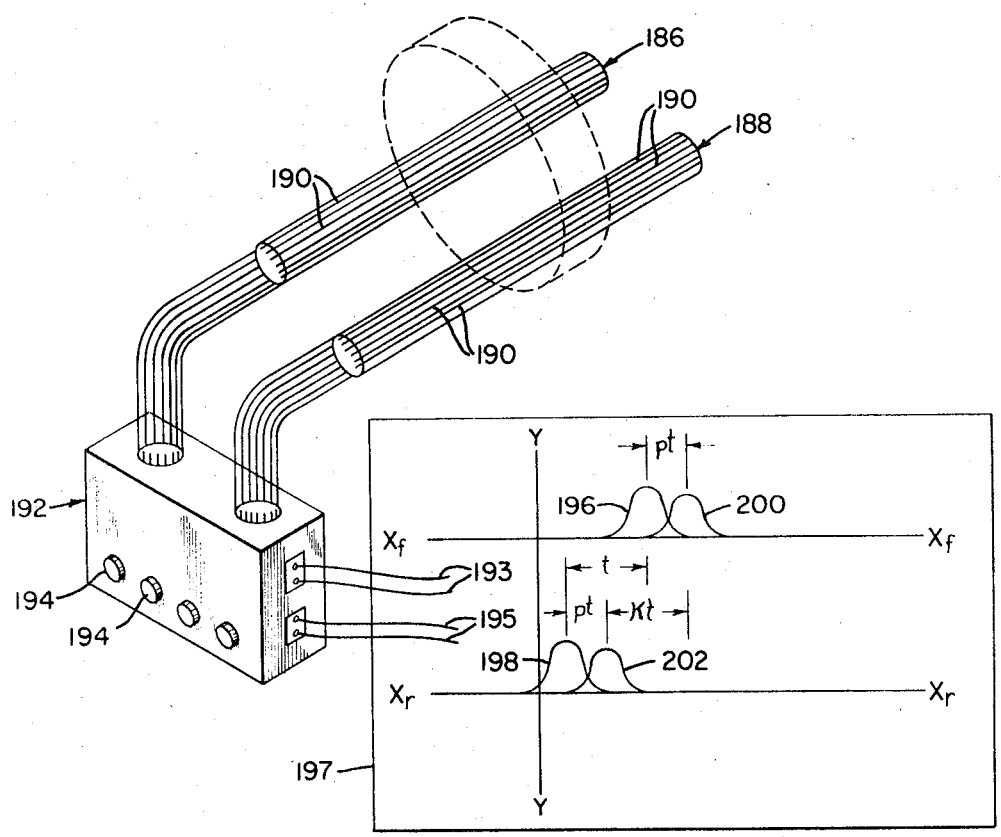
FIG. 17 is a schematic depiction of an apparatus for measuring static, pneumatic and kinetic caster trail of a wheel.

In FIG. 17 is shown a schematic modification of the apparatus shown in FIGS. 13–15 which may be used to measure the static, pneumatic and kinetic trail of a wheel mounted on a vehicle. Each of the rollers 150 and 152 of the apparatus shown in FIG. 13, is modified for the purpose of sensing and generating a signal proportional to the amount of force applied by the wheel in a direction longitudinally of the rollers. As shown in FIG. 17, both the front roller 186 and the rear roller 188 have a plurality of longitudinally extending force sensors such as a plurality of piezoelectric elements or strips 190. Each of the strips 190 are electrically connected to an X-Y printer 192. The X-Y printer 192 is adapted to print two sets of curves, one for the front roller 186, one for the rear roller 188. Consequently, the X-Y printer is connected through lines 193 and 195 to a pair of styluses (not shown) to effect the making of such curves. The rollers 186 and 188 are rotated in the same manner as the rollers 150 and 152 of the apparatus shown in FIG. 13–15. Suitable means (not shown) are used to synchronize one of the rollers with respect to the other said roller for the purpose of locating the curve printed along axis $X_f$—$X_f$ with respect to the curve printed along axis $X_r$—$X_r$ on a sheet of paper 197.

The operation of an apparatus as shown in FIGS. 13–15 as shown in FIG. 17 is now described. A wheel, shown in phantom, is mounted upon the synchronized rollers 186 and 188. The rollers 186 and 188 may be synchronized either physically through manual positioning thereof or electrically through suitable adjustments of the nobs 194 of the X-Y printer 192. The wheel (not shown) is adjusted to a predetermined position, X-Y printer 192 is actuated, and the wheel is then swung or turned a predetermined angle to the right or left. Turning or swinging of the wheel as described imparts a force extending in a longitudinal direction along surface of each of the rollers 186 and 188. Since this force is transmitted to a portion of the plurality of piezoelectric strips 190, each of the strips included within said portion generate a signal proportional to the amount of force transmitted therealong, while the remaining strips 190 do not generate any signal at all. This signal is transmitted to the X-Y printer 192 where through suitable circuitry and components, a resultant signal is transmitted to each of the styluses and curves 196 and 198 will be printed along a corresponding axis X—X. The distance along each of the axes X—X is representative of the circumferential periphery of each of the rollers 186 and 188. The distance along the Y—Y axis is representative of the amplitude of the signal generated by each of the piezoelectric strips 190. Curve 196 which is plotted along axis $X_f$—$X_f$ is representative of the force distribution within the piezoelectric strips 190 as sensed with respect to front roller 186 while curve 198 which is plotted along axis $X_r$—$X_r$ is representative of the force within piezoelectric strips 190 as sensed with respect to rear roller 188. When the rollers are properly synchronized, the horizontal distance separating the peak or maximum amplitudes of curves 196 and 198 is found to be proportional to the static trail $t$ of the vehicle wheel.

In order to measure pneumatic trail $pt$ and kinetic trail $kt$, the rollers 186 and 188 must be operated or, rotated following the positioning of a vehicle wheel thereon. Again, it is important to synchronize one of the rollers with respect to the other said roller. This synchronization is preferably done electronically. When the synchronized rotating rollers 186 and 188 are in the same relative position as when the static caster trail was measured, the rotating wheel is swung to the right or left by a predetermined amount and at the same time a plurality of signals are simultaneously fed from the piezoelectric strips to the X-Y printer 192. As in the case of measuring the static trail, these signals are stored in suitable memory devices and then recalled to plot along the corresponding X-Y axis curves 200 and 202. Curve 200 is representative of the longitudinal force distribution taken peripherally about the surface of roller 186 at one instant of time during rotation thereof while curve 202 is representative of the longitudinal force distribution taken peripherally about roller 188 at the same instant of time during rotation thereof. The pneumatic trail $pt$ is found to be proportional to the horizontal distance separating the peak or maximum amplitude of either curves 196 and 200 or curves 198 and 202. The kinetic trail $kt$ is found to be proportional to the horizontal distance separating the peak or maximum amplitudes of curves 200 and 202.

Thus, it will be readily appreciated that a simplified but highly reliable method and apparatus has been described for measuring the static, pneumatic and kinetic caster trail of a mounted vehicle wheel. It will be readily understood, however, that various modifications can be made to the apparatus illustrated herein for the purpose of measuring static, pneumatic and kinetic caster trails.

Very satisfactory results have been obtained using a distance between reference points 86 and 88 of about 7½ to 10 inches, or about 30 percent of the outside diameter of the wheel. However, greater or lesser distances can be used successfully. It is preferable to make the reference points 86 and 88 equidistant from wheel axle 106 because both the apparatus and the computations are simpler. However, the distances may be unequal if desired and can be accounted for by more complex computation or by applying correction factors determined mathematically or by experiment.

The measurements are lineal in nature and the instruments can be read with extreme accuracy, usually within 0.001 inch. Some slight error occurs as a result of departing slightly from mathematical accuracy, but it is always the same and can be compensated by applying a proper correction factor. In the conventional system the error results from the difficulty of measuring and reading angle changes which are frequently less than 1°. Since the error can be high or low and in varying amounts, it is not possible to apply a correction factor.

In checking the caster trail it is essential that the brakes be released. Since the kingpin normally has a downward and outward inclination and also a caster angle a locked wheel would not effectively rotate with respect to the pads and thereby produce erroneous readings. It is also preferred for correct measurement that the front end of the vehicle should be restrained against lateral movement. For this purpose the apparatus is provided as shown in FIG. 1 with a pair of stabilizers comprising uprights 108 and inwardly extending arms 110 adapted to engage the end portions of a conventional bumper 112. The stabilizers are slidably mounted for lateral movement on outward extensions 114 of the support 24 and may be actuated pneumatically or otherwise to grip the bumper between them and prevent any lateral movement of the bumper or of the vehicle to which it is attached.

It will be apparent to those skilled in the art that various changes and modifications may be made in the method and apparatus as disclosed without departing from the spirit of the invention, and it is intended that all such changes and modifications shall be embraced within the scope of the following claims.

I claim:

1. A method of determining the static caster trail of a steerable vehicle mounted wheel comprising: arranging said wheel in a direction; locating two reference points on the wheel fore and aft of the wheel axle; swinging the wheel laterally through an angle; measuring the relative velocities of each of said reference points; and comparing said velocities to compute the amount of static caster trail.

2. A method as claimed in claim 1; said direction being about midway in the extent of lateral travel of one of said reference points.

3. Apparatus for determining the static castor trail of a steerable, vehicle mounted wheel comprising: a support; a pair of contact members arranged generally in alignment along a fore and aft axis of said support; each of said members being individually, freely, laterally, movably mounted on said support; one of said members being adapted to contact a wheel forward of the wheel axle and the other member being adapted to contact a wheel rearwardly of the wheel axle; said members being adapted to move laterally in opposite directions in response to lateral swinging of a wheel; and means to measure the velocity of lateral movement of each of said members.

* * * * *